(12) United States Patent
Niu et al.

(10) Patent No.: US 8,359,512 B2
(45) Date of Patent: Jan. 22, 2013

(54) INTERFERENCE AVOIDANCE WITH SYNCHRONOUS HARQ AND PERSISTENT SCHEDULING

(75) Inventors: Huaning Niu, Milpitas, CA (US); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1049 days.

(21) Appl. No.: 12/347,862

(22) Filed: Dec. 31, 2008

(65) Prior Publication Data
US 2010/0005355 A1    Jan. 7, 2010

Related U.S. Application Data

(60) Provisional application No. 61/134,188, filed on Jul. 7, 2008.

(51) Int. Cl.
*H03M 13/03* (2006.01)
*H03M 13/53* (2006.01)

(52) U.S. Cl. .................................. 714/751; 714/712
(58) Field of Classification Search ................ None
See application file for complete search history.

(56) References Cited

U.S. PATENT DOCUMENTS

| | | | | |
|---|---|---|---|---|
| 5,886,995 | A * | 3/1999 | Arsenault et al. | 370/477 |
| 7,536,205 | B2 * | 5/2009 | Van Rensburg et al. | 455/562.1 |
| 7,778,151 | B2 * | 8/2010 | Bertrand et al. | 370/208 |
| 2003/0171118 | A1 * | 9/2003 | Miya | 455/442 |
| 2004/0017784 | A1 * | 1/2004 | Backlund | 370/256 |
| 2007/0177569 | A1 * | 8/2007 | Lundby | 370/349 |
| 2008/0019279 | A1 * | 1/2008 | Kim et al. | 370/241 |
| 2008/0101306 | A1 * | 5/2008 | Bertrand et al. | 370/336 |
| 2009/0141676 | A1 * | 6/2009 | Maheshwari et al. | 370/329 |

OTHER PUBLICATIONS

Shad et al. (Indoor SDMA capacity using a smart antenna basestation, IEEE 6th International Conference on Universal Personal Communications Record, Oct. 1997, vol. 2, pp. 868-872).*

* cited by examiner

*Primary Examiner* — Ajay Bhatia
*Assistant Examiner* — Dipakkumar Gandhi
(74) *Attorney, Agent, or Firm* — Kacvinsky Daisak PLLC (57) ABSTRACT

A method of avoiding periodic interference by permuting periodic transmissions by a base station (BS) may include transmitting a frame of data to a subscriber station (SS). The BS may check for an acknowledgement of the frame of data from the SS and may schedule a next frame of data for transmission or retransmission based on whether the acknowledgement was received from the SS. The scheduling may include permuting traffic within the next frame in time or in frequency relative to similar traffic in a prior frame according to a predetermined function. The BS may generate media access protocol (MAP) information for the next frame based on the permuting.

18 Claims, 5 Drawing Sheets

INTERFERENCE AVOIDANCE WITH SYNCHRONOUS HARQ AND PERSISTENT SCHEDULING

CROSS-REFERENCE TO RELATED APPLICATIONS

The present application claims the benefit of U.S. provisional application Ser. No. 61/134,188, filed Jul. 7, 2008, entitled "Techniques and Improvements for Broadband Wireless Networks," the entire content of which is incorporated by reference herein. This application is also related to U.S. patent application Ser. No. 12/317,112, filed Dec. 19, 2008, entitled "Dynamic Interference Avoidance With Asynchronous HARQ," the entire content of which is incorporated by reference herein.

BACKGROUND

Implementations of the claimed invention generally may relate to wireless communication, and in particular to schemes for avoiding recurring interference due to certain transmissions or retransmissions.

Modern wireless data communication systems such as WiMAX, WiMAX-II, 3GPP LTE are designed to combat wireless channel distortions. Orthogonal Frequency Division Multiple Access (OFDMA) is chosen over other techniques due to its excellent capability of dealing with a multipath channel, together with the multi-user diversity. With OFDMA, other methods of combating errors such as Forward Error Correction (FEC) and Hybrid Automatic Repeat Request (HARQ) are typically used.

Figure 1A:
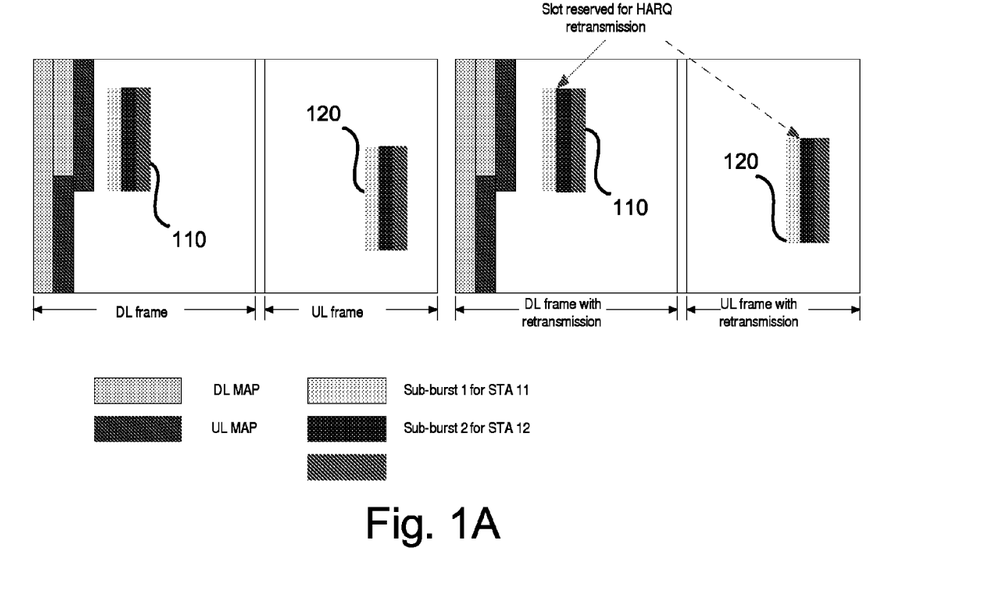
FIG. 1A illustrates an example of synchronous HARQ transmission.

The scheduling of HARQ retransmission may be either synchronous or asynchronous. For synchronous HARQ retransmission, the retransmissions will occur in predetermined locations (time and frequency) relative to the first transmission. Thus, once the first transmission is scheduled in the downlink (DL) (at slot 110) and/or uplink (UL) (at slot 120), the resource(s) 110/120 for future retransmissions are reserved, as shown in FIG. 1A. No additional scheduling/resource allocation is required for each retransmission 110 and/or 120.

In asynchronous HARQ, by way of contrast, each retransmission will be rescheduled explicitly. It has the flexibility of choosing the best time and frequency allocation. The price to pay for asynchronous HARQ relative to synchronous HARQ is the overhead associated with indicating the scheduling information for each retransmission.

Voice over internet protocol (VoIP) has been identified as one of the key applications for WiMAX, WiMAX-II and 3GPP LTE systems. Such systems may have to support a lot of VoIP users with a constant data rate and small packet size traffic. In such cases, the overhead of indicating resource allocation, the so-called media access protocol (MAP) overhead, may be very significant with VoIP traffic.

Figure 1B:
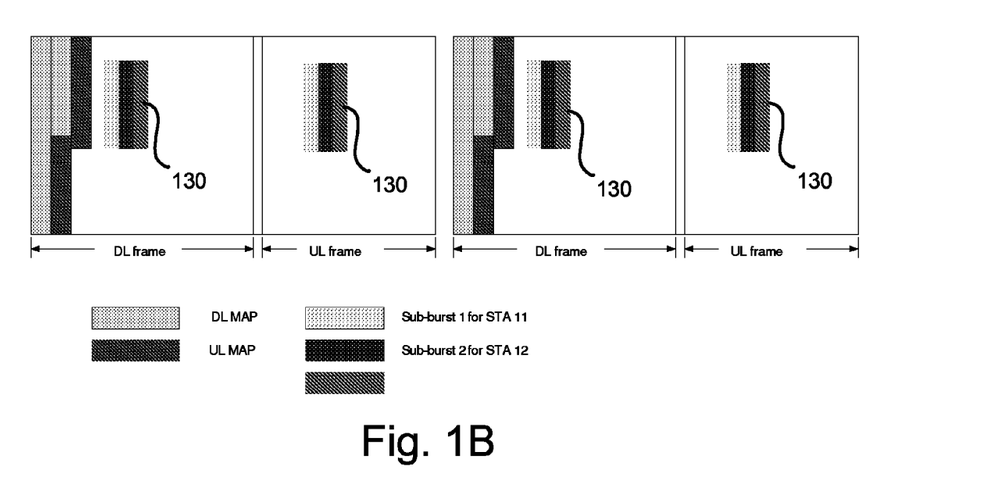
FIG. 1B illustrates an example frame structure for persistent scheduling.

One effective way to reduce the MAP overhead is called persistent scheduling. Persistent scheduling allocates resource(s) to a particular user or a group of users in a recurring pattern over a long period of time. For example, as shown in FIG. 1B, resources associated with a particular exchange or conversation may be periodically scheduled at a known position 130 in both DL transmission frames and UL transmission frames. Persistent scheduling works well with VoIP traffic, because the VoIP traffic pattern is very predictable. Thus, in persistent scheduling, the allocation of resources only needs to be made once over a relatively long period of time.

Although they are based on different mechanisms (e.g., synchronous HARQ transmissions and persistent scheduling), there are conceptual and visual similarities between FIGS. 1A and 1B, namely the predetermined, periodic (re) transmissions. Because both may include regular, structured resource allocation, both mechanisms may be susceptible to repeated interference with another similarly structured transmission.

For the mobile stations at a cell's edge, the dominant reason for packet loss is typically interference from nearby stations. There are several ways to mitigate interference, such as power control or beamforming. Power control denotes limiting the transmission power to the nearby stations to avoid interference to other stations in adjacent cell. Beamforming denotes focusing the transmission power to the desirable station only.

When synchronous HARQ or persistent scheduling is employed, data transmission may repeat at certain, fixed locations. In a multi-cell deployment, interference may occur in a repeating pattern. For example, when the neighboring cell has the same synchronous HARQ retransmission latency or persistent scheduling period, then if a transmission in the neighboring cell interferes with a first transmission, it will continue interfering with all the following transmission/retransmissions. If such interference is strong, it may cause significant performance degradation for the whole duration of HARQ retransmission or persistent scheduling. Two exemplary interference scenarios follow.

Figure 2A:
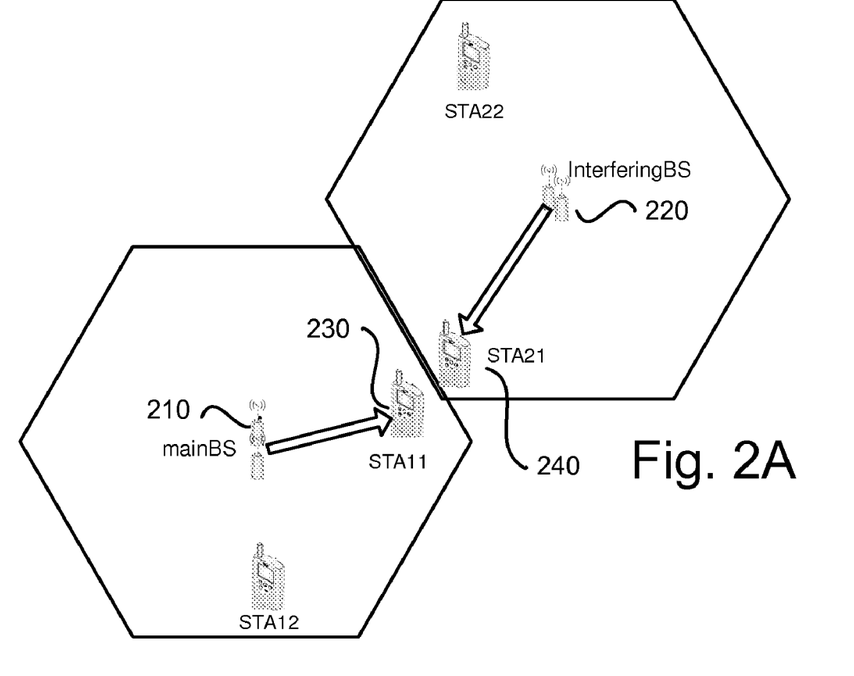
FIG. 2A illustrates an example of downlink packet loss due to packet collision.

A downlink interference example is shown in FIG. 2A, with one main base station (BS) 210 and another interfering base station 220. STA11 230 and STA12 are the two example mobile stations (STAs) associated with (e.g., within its hexagonal cell area) the main station 210, while STA21 240 and STA22 are the two stations associated with the interfering station. STA11 230 and STA21 240 are located at the cell edge and are close to each other. This example may assume both BSs 210/220 have implemented beamforming. When STA11 230 and STA21 240 are scheduled at the same time to receive packet from each base station, beamforming is not efficient and a packet loss is very likely. A packet collision may occur, because STA11 230 and STA12 240 are close to each other. Both stations 230 and 240 may request a retransmission. In a synchronous HARQ retransmission scheme, the retransmissions from BSs 210 and 220 will likely collide again. If a persistent scheduling scenario were implemented in the system of FIG. 2A, a similar collision around stations 230/240 would happen for each packet over the persistent allocation period.

An uplink interference example is shown in FIG. 2B, again with one main base station 210 and another interfering base station 220. STA11 230 and STA12 are the two example mobile stations associated with the main station 210, while STA21 240 and STA22 are the two stations associated with the interfering station 220. STA11 230 and STA21 240 are at the cell edge and are close to each other. In this example it may be assumed that the STA11 230 to main BS 210 link happens at the same time as the STA21 240 to interfering BS 220 link. With uplink omni-directional transmission, STA21 240 (shown transmitting to both BSs 210/220) may cause strong interference to main BS 210. Thus, packet loss is likely for both the main BS 210 and interfering BS 220. Both base stations may request a uplink retransmission. Both stations 210 and 220 may request a retransmission. In the synchronous HARQ retransmission regime, the retransmission may collide again. In a persistent scheduling case, a similar collision may happen for each packet over the persistent allocation period.

Hence, synchronous HARQ retransmissions, periodic scheduling, and/or any other type of periodic transmission, may experience periodic interference.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 2B:
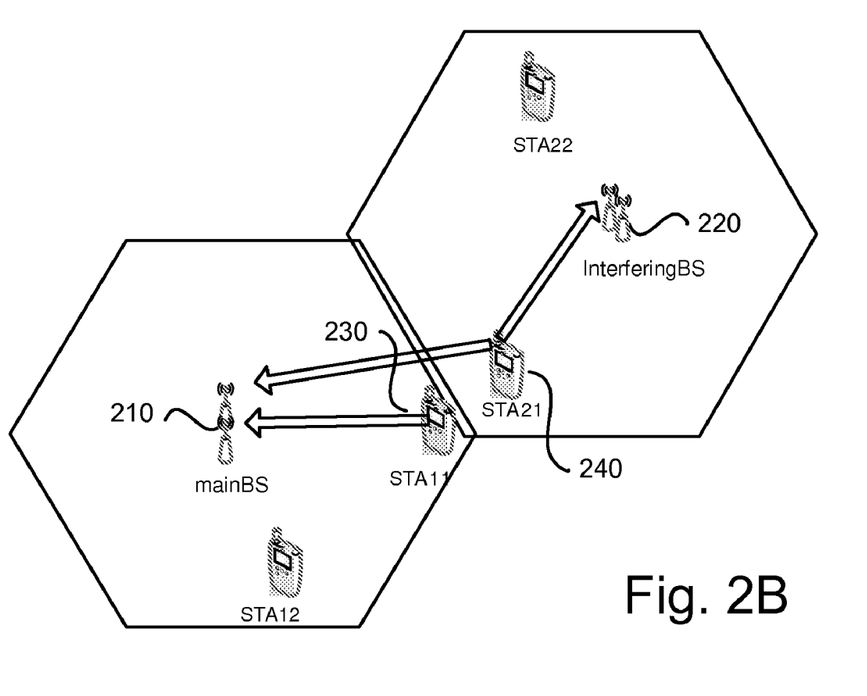
FIG. 2B illustrates an example of uplink packet loss due to adjacent cell interference.

Synchronized HARQ schemes may pre-allocate resources at fixed time/frequency slots for HARQ retransmission. When a transmission is successful, any remaining pre-allocated time slots will be cancelled and dynamically re-scheduled for other transmissions. To mitigate the interference problem in both uplink and downlink transmission as illustrated in FIGS. 2A and 2B, an improved synchronized HARQ scheme may permute (e.g., randomize, pseudo-randomize, or otherwise render non-periodic in time and/or frequency) the re-transmission slots for each BS.

Conceptually, such permutation of synchronous HARQ (or persistent scheduling) may be explained as follows. Let the set $X=[x_1, x_2, \ldots, x_N]$ denote the available resources (time slots and/or subchannels) for scheduling in each frame/sub-frame. Similarly $Y_0$ may denote the scheduled resource for first transmission: $Y_0=S(X)$, where $S(*)$ is a scheduling function that selects or chooses among the set X in a predetermined manner. For traditional synchronous HARQ, all (M−1) retransmissions after the first, $0^{th}$, transmission may use the same resource in the respective frame/sub-frame for retransmission, i.e. $Y_1 = \ldots = Y_{M-1} = Y_0 = S(X)$. Recall that this identical re-use is conceptually illustrated in FIGS. 1A and 1B.

In the modified scheme proposed herein, the resource being used in each retransmission is different from, and possibly dependent on, the location(s) of previous retransmissions. In the earlier mathematical expression, $Y_k=S_j(X, Y_0, \ldots, Y_{k-1})$ for a kth retransmission or persistent scheduling transmission. Here, $S_j(*)$ may denote a non-periodic scheduling function that may differ within or among BSs based on the parameter j. In some implementations, j may vary based on the identifier (ID) of the BS. In some implementations, j may vary based on a location of a transmission sector within a BS's coverage area. In either case, the pattern of $Y=[Y_0, Y_1, \ldots, Y_{M-1}]$ may be cell dependent so that the neighboring cells will not collide on all re-transmissions.

One example implementation may be to permute all resources X in each frame/sub-frame in a predetermined cell specific manner. For example, in first retransmission the resource may be permuted $X_1=f_1(X)$, which is a change (e.g., in time and/or frequency) from the original resource X. The scheduling for the second retransmission may be $Y_1=S(X_1)$. In the second retransmission, in some implementations, the assigned resource may be changed according to $X_2=f_2(X)$. The functions $f_1$ and $f_2$ are cell specific (or alternately, sector specific) and optimized to avoid inter-cell interference. The functions $f_1$ and $f_2$ may be pre-specified in a wireless standard to assure uniform practice among BSs from different manufacturers. No additional signaling is needed for each re-transmission.

Although the preceding example permutes the resource X first, different scheduling functions may be used to accomplish much the same goal. For example, $S(*)$ may be a two-dimensional function of time and/or frequency. For a case where the interference occurs due to beamforming, the scheduling function $S(*)$ may permute the transmission in time, but not in frequency, so the beamforming vector will not change. Another example may include a high-mobility scenario, where beamforming is impractical. In such a case, the scheduling function $S(*)$ may permute the transmission in frequency by changing sub-channels.

Though the resources and/or scheduling thereof may be permuted according to the examples above, such are not exhaustive of possible permutations of what were formerly repeating resources for retransmission (e.g., synchronous HARQ) or persistent scheduling. The scheme herein contemplates any two-dimensional function across time or frequency or both that permutes or changes a resource from regularly repeating (and hence being susceptible to repeating interference). Such a function may be randomizing, pseudo-randomizing, or predefined in any manner that lessens the chance of repeated collisions (e.g., one of a relatively small set of pre-defined changes, with or without a predefined ordering). Such a function may depend only on the set of available resources $X=[x_1, x_2, \ldots, x_N]$ without reference to earlier-assigned resources (e.g., $Y=S(X)$), or it may be based at least partially on earlier-assigned resources (e.g., $Y=S(X, Y)$).

Further, the permutation of regular resources may, in some implementations, be dependent on a third variable, location. As alluded to above, the permutation function $S(*)$ may differ based on BS identifier, the sector(s) within a BS's cell, adjacent cell geography, or any other spatial characteristic that takes into account inter-cell interference effects. Although such permutation function $S(*)$ may include a spatial aspect, it need not necessarily include such. For example, ease of implementation may in some cases recommend a function S(*) that does not take into account BS ID, sector number, or any other cell-specific spatial value.

It should be emphasized that regardless of the permuting or scheduling function S(*) chosen, it should be predetermined so that it only has to be assigned once per relevant event (e.g., retransmission for synchronous HARQ or scheduling event for persistent scheduling). In this manner, the permuting function lessens or obviates the possibility of repeating interference, while maintaining the overhead advantage, over for example asynchronous HARQ, of not having to assign resources for each periodic (re)transmission. Hence, the permuting scheme described herein maintains the features of "periodic" resource assignment, without the possible repetitive interference penalty arising from assigning resources at exactly the same time and/or frequency in subsequent (re) transmissions.

Figure 3:
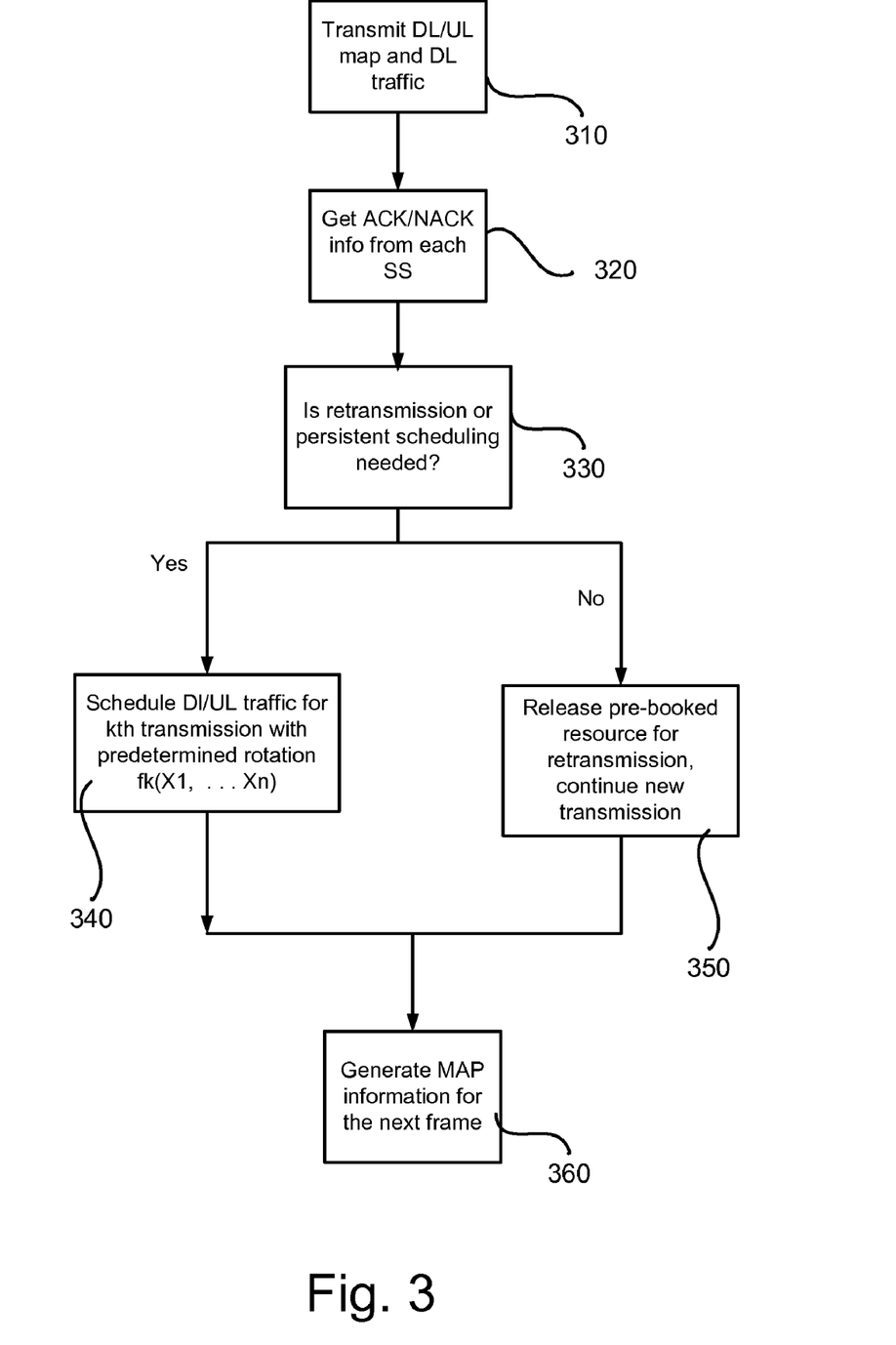
FIG. 3 conceptually illustrates a block diagram for BS scheduling with synchronous HARQ or persistent scheduling.

FIG. 3 conceptually illustrates the above concepts in a block diagram for BS scheduling with synchronous HARQ or persistent scheduling. The process may begin with a BS transmitting a DL/UL map and DL traffic to one or more SSs [act 310]. The DL/UL map may include where resources are allocated in the upcoming DL and UL transmissions. The former lets the SSs know where/when to look for data in received transmissions, and the latter lets the SSs know where/when to transmit data (e.g., and acknowledgment (ACK)). Act 310 may also include the first downlink (DL) transmission of traffic. In conjunction with act 310, the BS may also predetermine via a scheduling function S(*) the location(s) and/or frequencies of any future retransmissions or persistent scheduling transmissions. Alternately, the BS may determine just the initial resource allocation, leaving the scheduling function S(*) to later in the process.

Processing may continue with the BS receiving an ACK or NACK (negative confirmation) from the SSs [act 320]. Reception of the ACK/NACK, or in some instances non-reception thereof, may indicate to the BS whether another transmission is needed [act 330]. For example, if in response to the DL transmission in act 310 an ACK is not received, BS may determine in act 330 that a retransmission is needed in the synchronous HARQ case. As another example, if an ACK/NACK is received, it may still indicate to the BS in act 330 that another transmission is needed in the persistent scheduling case.

If the BS determines that a retransmission is needed, or if another persistent scheduling transmission is warranted, in act 330 it may schedule the DL/UL traffic for such transmission according to the scheduling function S(*), which may in some implementations be expressed as a function $f_k$ of the resource set X, $f_k(X1, \ldots, X(n))$ [act 340]. In some implementations, this scheduling permutation may be computed for a particular (re)transmission in act 340, but in others it may be computed for all (re)transmissions in an earlier act, such as 310. Either way, act 340 may permute (e.g., by randomizing, pseudorandomizing, etc.) the particular UL/DL resource(s) $X_k$ beyond regularly repeating allocations that would otherwise happen for synchronous HARQ or persistent scheduling.

If the BS does not determine that a retransmission is needed, or if another persistent scheduling transmission is warranted, in act 330 it may release any associated, predetermined resources and/or continue with its transmission if appropriate [act 350]. Then the BS may generate MAP information for the next frame [act 360]. The MAP information may include the permuted scheduling resources determined in act 340.

Figure 4A:
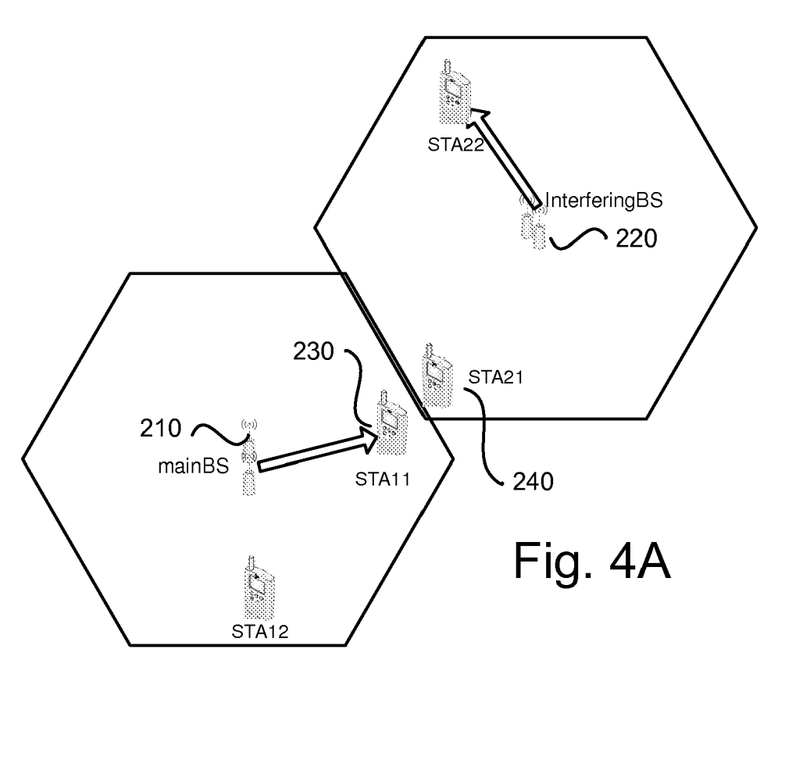
FIG. 4A illustrates an example of downlink HARQ retransmission or persistent scheduling with collision avoidance.

FIG. 4A illustrates an example of downlink (DL) HARQ retransmission or persistent scheduling with collision avoidance. In contrast to FIG. 2A, BS 220 in FIG. 4A is transmitting to STA22 while BS 210 is transmitting to STA11 230. In act 310 or act 330 one or both of BSs 210 and 220 may have scheduled their respective (re)transmissions to go to spatially remote SSs. Such permutation of normal periodic scheduling may occur in the time domain, and may also have a spatial aspect as illustrated in FIG. 4A. Although not explicitly shown in FIG. 4A, the DL scheduling may also or alternately have a frequency aspect that permutes subchannels among the various DL (re)transmissions.

Figure 4B:
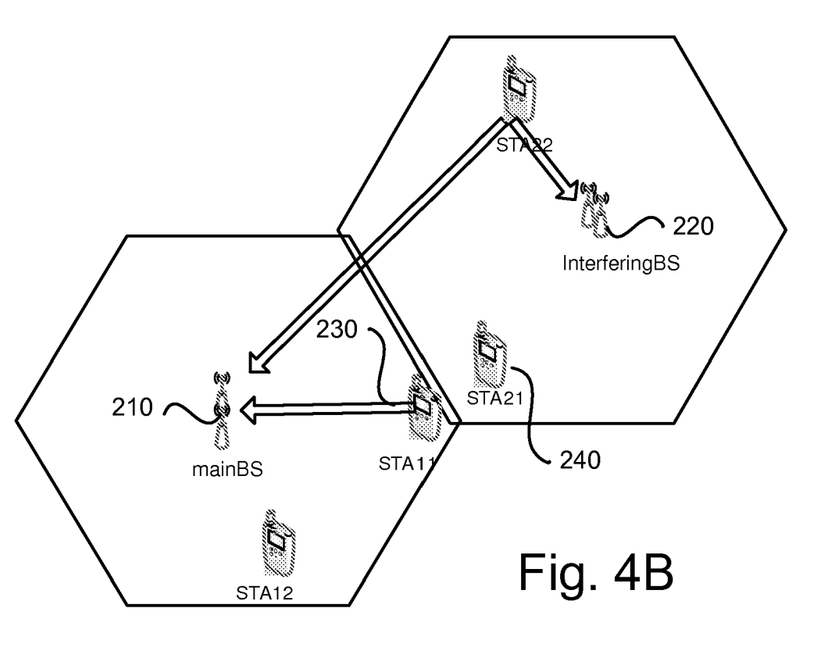
FIG. 4B illustrates an example of uplink HARQ retransmission or persistent scheduling with interference avoidance.

FIG. 4B illustrates an example of uplink (UL) HARQ retransmission or persistent scheduling with interference avoidance. In contrast to FIG. 2B, STA22 in FIG. 4B is omnidirectionally transmitting while STA11 230 is transmitting to BS 210. The remote origin of the transmission from STA22 may cause a weaker interference at BS 210. In act 310 or act 330 one or both of BSs 210 and 220 may have scheduled their respective UL (re)transmissions to come from spatially remote SSs. Such permutation of normal periodic UL scheduling may occur in the frequency domain (e.g., using different subchannels), and may also have a spatial aspect as illustrated in FIG. 4B. Although not explicitly shown in FIG. 4A, the UL scheduling may also or alternately have a temporal aspect that permutes time slots among the various UL (re)transmissions.

Figure 5:
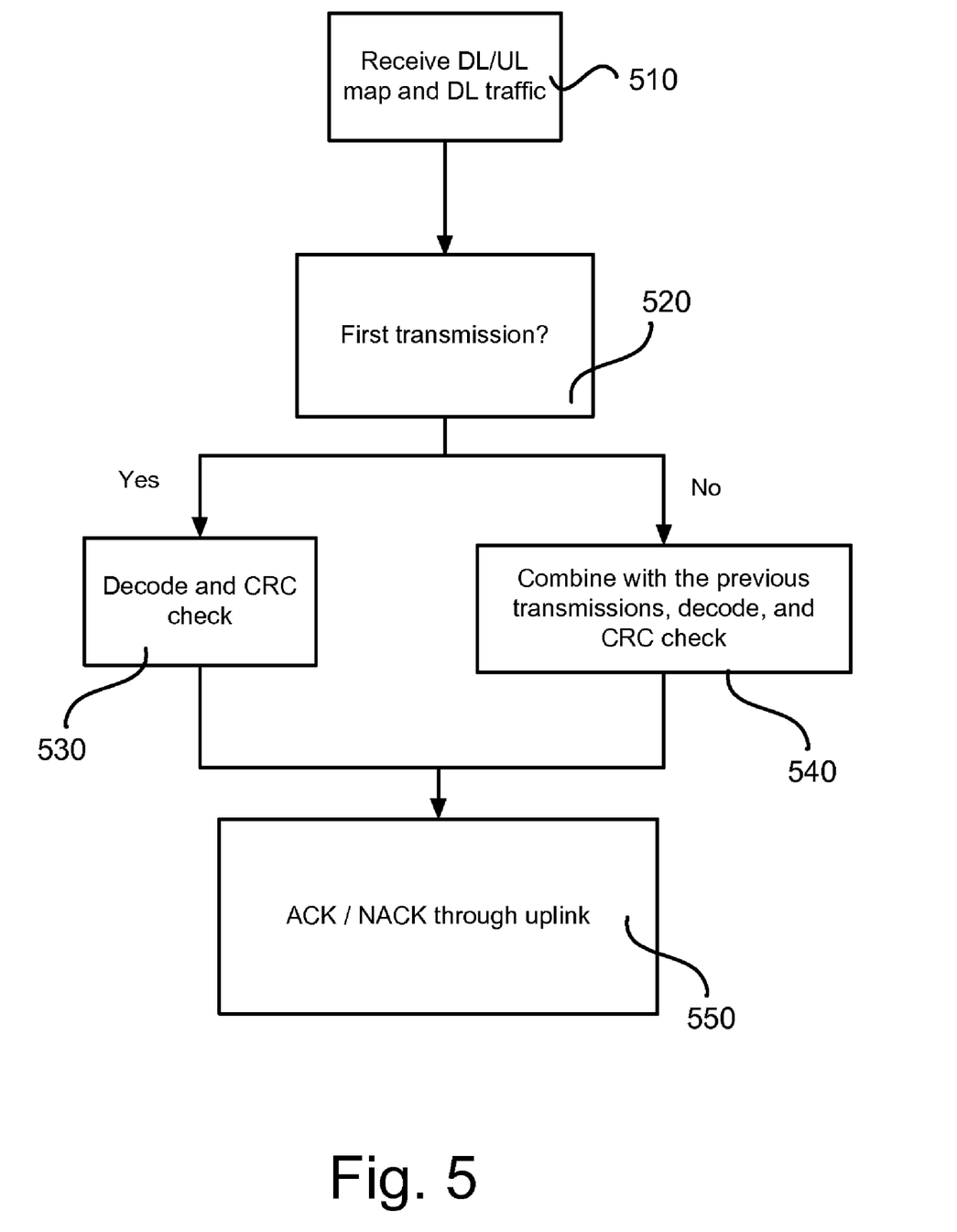
FIG. 5 conceptually illustrates a block diagram for SS.

FIG. 5 conceptually illustrates a block diagram for reception of permuted, scheduled (re)transmissions by a SS. The SS may receive a DL/UL map and DL traffic from a BS [act 510]. In some implementations, SS may determine permuted locations and/or frequencies for (re)transmissions from the DL/UL map.

Processing may continue with the SS determining if the received DL traffic is the first transmission either of an attempt to send data or of a persistently scheduled session [act 520]. SS may examine, for example, already acknowledged data to make such a determination. SS may, however, use other known schemes to determine whether the received data is a first transmission. If the DL traffic is the first transmission, the SS may decode the received data and perform a cyclic redundancy check (CRC) [act 530].

If the DL traffic is not the first transmission, the SS may combine with previous transmissions, decode the received data, and perform a cyclic redundancy check (CRC) [act 540]. In some implementations, SS may in act 540 use the same scheduling function S(*) as the BS to determine where in the DL map to look for the permuted data. Once act 530 or 540 is performed, the SS may ACK/NACK through the uplink [act 550]. In act 550, SS may also in some cases transmit data over the uplink based on the UL map received in act 510.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method of scheduling retransmissions in synchronous hybrid automatic repeat request (HARQ) wireless signaling by a base station, comprising:
 transmitting a resource map and downlink traffic to a subscriber station;
 determining whether a retransmission of the downlink traffic is desired to the subscriber station; and
 scheduling the retransmission of the downlink traffic by applying a non-periodic scheduling function to a set of resources available for use in the retransmission, the scheduling function selected based on a location of the base station.

2. The method of claim 1, wherein the scheduling function operates to randomize use of the set of resources in time or in frequency.

3. The method of claim 1, wherein the scheduling function operates to pseudo-randomize use of the set of resources in time or in frequency.

4. The method of claim 1, wherein the scheduling function depends on an identifier of the base station.

5. The method of claim 1, wherein the scheduling function depends on a sector within a coverage area of the base station to which the retransmission is directed.

6. The method of claim 1, further comprising:
 determining whether an acknowledgment has been received from the subscriber station, wherein the retransmission of the download traffic is determined to be desired when the acknowledgment has not been received from the subscriber station.

7. The method of claim 1, further comprising:
 generating media access protocol (MAP) information for a next frame of data based on the scheduling function applied to the set of resources.

8. A method of scheduling transmissions in persistent scheduling wireless signaling by a base station, comprising:
 transmitting a resource map and a downlink frame associated with an event to a subscriber station;
 determining whether a next transmission of another downlink frame associated with the event is desired to the subscriber station; and
 scheduling the next transmission by applying a non-periodic scheduling function to a set of resources available for use in the next transmission, the scheduling function selected based on a location of the base station.

9. The method of claim 8, wherein the scheduling function operates to randomize or pseudo-randomize use of the set of resources in time or in frequency.

10. The method of claim 8, wherein the scheduling function depends on an identifier of the base station or on a sector within a coverage area of the base station to which the next transmission is directed.

11. The method of claim 8, wherein the scheduling function is a function of time and the location of the base station.

12. The method of claim 8, wherein the scheduling function is a function of frequency and the location of the base station.

13. The method of claim 8, further comprising:
 determining whether an acknowledgment of the downlink frame has been received from the subscriber station, wherein the next transmission is determined to be desired when the acknowledgment has been received from the subscriber station.

14. The method of claim 8, further comprising:
 generating media access protocol (MAP) information for a next frame of data based on the scheduling function applied to the set of resources.

15. A method of avoiding periodic interference by permuting periodic transmissions by a base station, comprising:
 transmitting a frame of data to a subscriber station; checking for an acknowledgement of the frame of data from the subscriber station;
 scheduling a next frame of data for transmission or retransmission based on whether the acknowledgement was received from the subscriber station, the scheduling including:
  permuting traffic within the next frame in time or in frequency relative to similar traffic in a prior frame according to a predetermined function, selected based on a location of the base station; and
 generating media access protocol information for the next frame based on the permuting.

16. The method of claim 15, wherein the predetermined function operates to randomize or pseudo-randomize the traffic within the next frame in time or in frequency relative to the similar traffic in the prior frame.

17. The method of claim 15, wherein the scheduling includes:
 permuting traffic within the next frame in time and in frequency relative to similar traffic in a prior frame according to a predetermined function.

18. The method of claim 15, wherein the scheduling includes scheduling the next frame of data for transmission in a persistent scheduling scheme or scheduling the next frame for retransmission in a synchronous hybrid automatic repeat request (HARQ) scheme.

* * * * *

UNITED STATES PATENT AND TRADEMARK OFFICE
CERTIFICATE OF CORRECTION

| | |
|---|---|
| PATENT NO. | : 8,359,512 B2 |
| APPLICATION NO. | : 12/347862 |
| DATED | : January 22, 2013 |
| INVENTOR(S) | : Niu Huaning et al. |

It is certified that error appears in the above-identified patent and that said Letters Patent is hereby corrected as shown below:

On sheet 3 of 5, in Figure 3, Reference Numeral 340, line 1, delete "DI/UL" and insert -- DL/UL --, therefor.

In column 8, line 31, in claim 15, delete "function," and insert -- function --, therefor.

Signed and Sealed this
Twenty-sixth Day of March, 2013

Teresa Stanek Rea
*Acting Director of the United States Patent and Trademark Office*